US008009172B2

(12) United States Patent
Jiao et al.

(10) Patent No.: US 8,009,172 B2
(45) Date of Patent: Aug. 30, 2011

(54) GRAPHICS PROCESSING UNIT WITH SHARED ARITHMETIC LOGIC UNIT

(75) Inventors: Guofang Jiao, San Diego, CA (US); Brian Ruttenberg, Goleta, CA (US); Chun Yu, San Diego, CA (US); Yun Du, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 696 days.

(21) Appl. No.: 11/550,344

(22) Filed: Oct. 17, 2006

(65) Prior Publication Data

US 2008/0030512 A1 Feb. 7, 2008

Related U.S. Application Data

(63) Continuation-in-part of application No. 11/499,187, filed on Aug. 3, 2006.

(51) Int. Cl.
*G06T 1/20* (2006.01)
(52) U.S. Cl. ......... 345/506; 345/522; 345/581; 345/606
(58) Field of Classification Search ............... 345/504, 345/423, 419, 558; 711/154
See application file for complete search history.

(56) References Cited

U.S. PATENT DOCUMENTS

| | | | | |
|---|---|---|---|---|
| 4,951,232 A | * | 8/1990 | Hannah | 345/422 |
| 5,448,689 A | * | 9/1995 | Matsuo et al. | 345/600 |
| 5,870,509 A | | 2/1999 | Alcorn | |
| 5,886,711 A | * | 3/1999 | Rossin et al. | 345/503 |
| 5,914,726 A | | 6/1999 | Schultz | |
| 6,157,393 A | * | 12/2000 | Potter et al. | 345/505 |
| 6,476,816 B1 | * | 11/2002 | Deming et al. | 345/502 |
| 6,549,209 B1 | | 4/2003 | Shinohara et al. | |
| 6,577,305 B1 | * | 6/2003 | Duluk et al. | 345/419 |
| 6,642,928 B1 | * | 11/2003 | Deming et al. | 345/504 |
| 6,690,380 B1 | | 2/2004 | Hussain et al. | |
| 6,717,577 B1 | | 4/2004 | Cheng et al. | |

(Continued)

FOREIGN PATENT DOCUMENTS

EP 1096427 5/2001

(Continued)

OTHER PUBLICATIONS

International Search Report, PCT/US07/074882, International Search Authority, European Patent Office, May 16, 2008.

(Continued)

*Primary Examiner* — Xiao M Wu
*Assistant Examiner* — Phi Hoang
(74) *Attorney, Agent, or Firm* — Timothy F. Loomis; James R. Gambale, Jr.

(57) ABSTRACT

This disclosure describes a graphics processing unit (GPU) pipeline that uses one or more shared arithmetic logic units (ALUs). In order to facilitate such sharing of ALUs, the stages of the disclosed GPU pipeline may be rearranged relative to conventional GPU pipelines. In addition, by rearranging the stages of the GPU pipeline, efficiencies may be achieved in the image processing. Unlike conventional GPU pipelines, for example, an attribute gradient setup stage can be located much later in the pipeline, and the attribute interpolator stage may immediately follow the attribute gradient setup stage. This allows sharing of an ALU by the attribute gradient setup and attribute interpolator stages. Several other techniques and features for the GPU pipeline are also described, which may improve performance and possibly achieve additional processing efficiencies.

30 Claims, 6 Drawing Sheets

U.S. PATENT DOCUMENTS

| | | | |
|---|---|---|---|
| 6,774,896 B2 | 8/2004 | Oka | |
| 6,885,378 B1 * | 4/2005 | Tsai et al. | 345/557 |
| 6,972,769 B1 | 12/2005 | Nebeker et al. | |
| 7,036,692 B2 | 5/2006 | Krohn | |
| 7,098,924 B2 * | 8/2006 | Prokopenko et al. | 345/581 |
| 7,233,334 B1 | 6/2007 | Acocella et al. | |
| 7,505,036 B1 | 3/2009 | Baldwin | |
| 7,710,427 B1 * | 5/2010 | Hutchins et al. | 345/561 |
| 2004/0201592 A1 * | 10/2004 | Huang | 345/558 |
| 2005/0066205 A1 * | 3/2005 | Holmer | 713/320 |
| 2005/0253862 A1 | 11/2005 | Hutchins et al. | |
| 2006/0050072 A1 * | 3/2006 | Goel | 345/423 |
| 2007/0040844 A1 * | 2/2007 | Junkins | 345/582 |
| 2009/0006773 A1 * | 1/2009 | Yamaguchi et al. | 711/154 |

FOREIGN PATENT DOCUMENTS

| | | |
|---|---|---|
| JP | 2005322224 A | 11/2005 |
| WO | 2005088454 | 9/2005 |

OTHER PUBLICATIONS

Written Opinion, PCT/US07/074882, International Search Authority, European Patent Office, May 16, 2008.

International Preliminary Report on Patentability, PCT/US07/074882, International Preliminary Examining Authority, European Patent Office, Nov. 28, 2008.

Deering, Michael F. and Nelson, Scott R, "Leo: A System for Cost Effective 3D Shaded Graphics," Siggraph '93, Proceedings of the 20th Annual Conference on Computer Graphics and Interactive Techniques, 1993, pp. 101-108, XP002516786.

International Search Report and Written Opinion—PCT/US2007/081428, International Search Authority—European Patent Office—Mar. 12, 2009.

Miyamoto, N. et al., "An image recognition processor using dynamically reconfigurable ALU", IEEE 2004 Custom Integrated Circuits Conference, Oct. 22, 2004, pp. 599-602.

* cited by examiner

GRAPHICS PROCESSING UNIT WITH SHARED ARITHMETIC LOGIC UNIT This application is a continuation-in-part (CIP) of co-pending and commonly assigned application Ser. No. 11/499,187, filed on Aug. 3, 2006, the entire content of which is incorporated herein by reference.

TECHNICAL FIELD

This disclosure relates to graphics processing units and, more particularly, graphics processing units that have a multi-stage pipelined configuration for processing images.

BACKGROUND

A graphics processing unit (GPU) is a dedicated graphics rendering device utilized to manipulate and display computerized graphics on a display. GPUs are built with a highly parallel structure that provides more efficient processing than typical, general purpose central processing units (CPUs) for a range of complex graphics-related algorithms. For example, the complex algorithms may correspond to representations of three-dimensional computerized graphics. A GPU may implement a number of so-called "primitive" graphics operations, such as forming points, lines, and triangles, to create complex, three-dimensional images on a display more quickly than drawing the images directly to the display with a CPU.

Vertex shading and pixel shading are often utilized in the video gaming industry to determine final surface properties of a computerized image, such as light absorption and diffusion, texture mapping, light reflection and refraction, shadowing, surface displacement, and post-processing effects. GPUs typically include a number of pipeline stages such as one or more shader stages, setup stages, rasterizer stages and interpolation stages.

A vertex shader, for example, is typically applied to image data, such as the geometry for an image, and the vertex shader generates vertex coordinates and attributes of vertices within the image data. Vertex attributes may include color, normal, and texture coordinates associated with a vertex. One or more primitive setup and rejection modules may form primitive shapes such as points, lines, or triangles, and may reject hidden or invisible primitive shapes based on the vertices within the image data. An attribute setup module computes gradients of attributes within the primitive shapes for the image data. Once the attribute gradient values are computed, primitive shapes for the image data may be converted into pixels, and pixel rejection may be performed with respect to hidden primitive shapes.

An attribute interpolator then interpolates the attributes over pixels within the primitive shapes for the image data based on the attribute gradient values, and sends the interpolated attribute values to the fragment shader for pixel rendering. Results of the fragment shader are output to a post-processing block and a frame buffer for presentation of the processed image on the display. This process is performed along successive stages of the GPU pipeline.

SUMMARY

In general, this disclosure describes a graphics processing unit (GPU) pipeline that uses one or more shared arithmetic logic units (ALUs). In order to facilitate such sharing of ALUs, the stages of the disclosed GPU pipeline may be rearranged relative to conventional GPU pipelines. In addition, by rearranging the stages of the GPU pipeline, efficiencies may be achieved in the image processing. Several other techniques and features for the GPU pipeline are also described, which may improve performance and possibly achieve additional processing efficiencies. For example, an extended vertex cache is also described for the GPU pipeline, which can significantly reduce the amount of data needed to be transferred through the successive stages of the GPU pipeline.

In one embodiment, the disclosure provides a method comprising receiving image data for an image within a GPU pipeline, and processing the image data within the GPU pipeline using a shared arithmetic logic unit for an attribute gradient setup stage and an attribute interpolator stage.

In another embodiment, this disclosure provides a device comprising a GPU pipeline that receives image data for an image and processes the image data within multiple stages, wherein the multiple stages include an attribute gradient setup stage and an attribute interpolator stage, and a shared arithmetic logic unit that performs attribute gradient setups and attribute interpolations associated with both the attribute gradient setup stage and the attribute interpolator stage.

In another embodiment, this disclosure provides a device comprising means for receiving image data for an image, means for processing the image data in an attribute gradient setup stage using a shared arithmetic logic unit, and means for processing the image data in an attribute interpolator stage using the shared arithmetic logic unit.

The techniques described herein may be implemented in hardware, software, firmware, or any combination thereof. If implemented in software, the techniques may be realized in whole or in part by a computer readable medium comprising instructions that, when executed by a machine, such as a processor, perform one or more of the methods described herein.

Accordingly, this disclosure also contemplates a computer-readable medium comprising instructions that upon execution cause a machine to receive image data for an image within a GPU pipeline, and process the image data within the GPU pipeline using a shared arithmetic logic unit for an attribute gradient setup stage and an attribute interpolator stage.

The details of one or more embodiments are set forth in the accompanying drawings and the description below. Other features, objects, and advantages of the invention will be apparent from the description and drawings, and from the claims.

DETAILED DESCRIPTION

Figure 1:
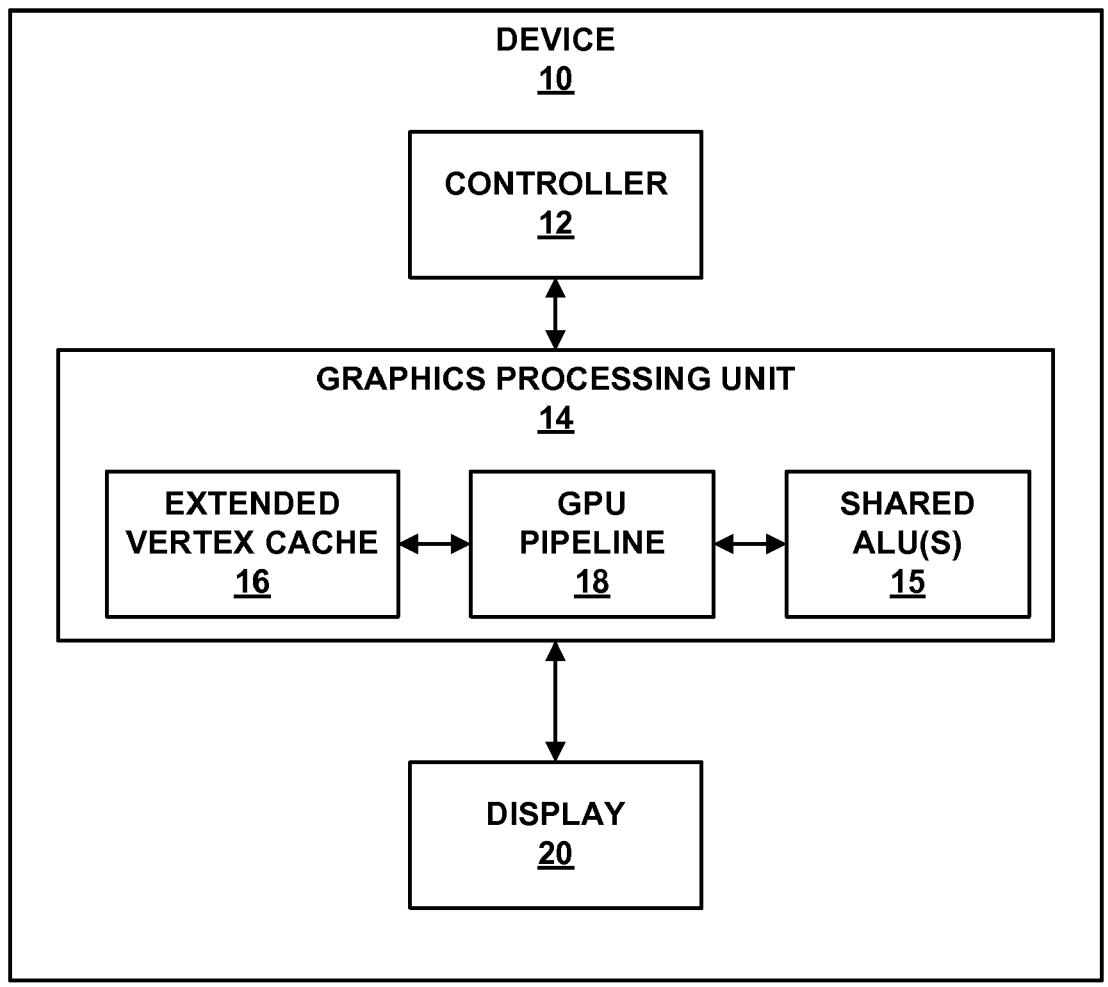
FIG. 1 is a block diagram illustrating an exemplary device including a graphics processing unit (GPU) that uses one or more shared arithmetic logic units (ALUs) and an extended vertex cache.

FIG. 1 is a block diagram illustrating an exemplary device 10 including a graphics processing unit (GPU) 14 that includes a GPU pipeline 18 for processing computerized images. According to this disclosure, GPU pipeline 18 utilizes one or more shared arithmetic logic units (ALUs) 15 to reduce complexity of GPU 14 and create efficiency in the image processing. In addition, GPU pipeline may implement an extended vertex cache 16 in order to reduce the amount of data propagated through GPU pipeline 18. As discussed in greater detail below, the stages of GPU pipeline 18 may be rearranged relative to conventional GPU pipelines, which may improve the process of image processing and facilitate the use of shared ALUs 15. Some stages, however, may still use dedicated (unshared) ALUs like those used in stages of conventional GPU pipelines.

In the example of FIG. 1, device 10 includes a controller 12, GPU 14 and a display 20. Device 10 may also include many other components (not shown). For example, device 10 may comprise a wireless communication device and display 20 may comprise a display within the wireless communication device. As another example, device 10 may comprise a desktop or notebook computer, and display 20 may comprise a dedicated monitor or display of the computer. Device 10 may also comprise a wired communication device or a device not principally directed to communication. As other examples, device 10 may comprise a personal digital assistant (PDA), handheld video game device, game console or television device that includes display 20. In various embodiments, computerized video imagery may be obtained from a remote device or from a local device, such as a video server that generates video or video objects, or a video archive that retrieves stored video or video objects.

Controller 12 controls operation of GPU 14. Controller 12 may be a specific controller for GPU 14 or a more general controller that controls the overall operation of device 10. In accordance with the techniques described herein, GPU 14 includes a GPU pipeline 18 that implements and accesses shared ALUs 15. In addition, GPU 14 may include an extended vertex cache 16 coupled to GPU pipeline 18. Again, shared ALUs may create efficiency in the image processing and the incorporation of extended vertex cache 16 may reduce an amount of data passing through GPU pipeline 18 within GPU 14. GPU pipeline 18 may be arranged in a non-conventional manner in order to facilitate the use of shared ALUs 15 and extended vertex cache 16.

GPU 14 receives image data, such as geometrical data and rendering commands for an image from controller 12 within device 10. The image data may correspond to representations of complex, two-dimensional or three-dimensional computerized graphics. GPU 14 processes the image data to present image effects, background images, or video gaming images, for example, to a user of device 10 via a display 20. The images may be formed as video frames in a sequence of video frames. Display 20 may comprise a liquid crystal display (LCD), a cathode ray tube (CRT) display, a plasma display, or another type of display integrated with or coupled to device 10.

In some cases, controller 12 may receive the image data from applications operating within device 10. For example, device 10 may comprise a computing device operating a video gaming application based on image data received from an internal hard drive or a removable data storage device. In other cases, controller 12 may receive the image data from applications operating external to device 10. For example, device 10 may comprise a computing device operating a video gaming application based on image data received from an external server via a wired or wireless network, such as the Internet. The image data may be received via streaming media or broadcast media, which may be wired, wireless or a combination of both.

When a user of device 10 triggers an image effect, selects a background image, or initiates a video game, controller 12 receives the corresponding image data from an application and sends the image data to GPU 14 for image processing. GPU 14 processes the image data to prepare the corresponding image for presentation on display 20. For example, GPU 14 may implement a number of primitive graphics operations, such as forming points, lines, and triangles, to create a three-dimensional image represented by the received image data on display 20.

According to the techniques described herein, GPU pipeline 18 receives the image data for the image and stores attributes for vertices within the image data in extended vertex cache 16. GPU pipeline 18 only passes vertex coordinates that identify the vertices, and vertex cache index values that indicate storage locations of the attributes for each of the vertices in extended vertex cache 16 to other processing stages along GPU pipeline 18. In some embodiments, GPU pipeline 18 temporarily stores the vertex coordinates in extended vertex cache 16. In this manner, GPU pipeline 18 is not clogged with the transfer of the vertex attributes between stages, and can support increased throughput, and storage buffers between stages may also be eliminated or possibly reduced in size. The vertex coordinates identify the vertices within the image data based on, for example, a four-dimensional coordinate system with X, Y, and Z (width, height, and depth) coordinates that identify a location of a vertex within the image data, and a W coordinate that comprises a perspective parameter for the image data. The vertex attributes, for example, may include color, normal, and texture coordinates associated with a vertex.

Furthermore, in accordance with this disclosure, during the processing of image data in GPU pipeline 18, one or more shared ALUs 15 are used for different stages. As one example, a shared ALU may be used for both a triangle setup stage and a Z-Gradient setup stage. A shared lookup table for reciprocal operation may also be used in these triangle setup and Z-Gradient setup stages. As another example, a shared ALU may be used for both attribute gradient setup stage and an attribute interpolator stage. Unlike conventional GPU pipelines, the attribute gradient setup stage can be located much later in the pipeline, and the attribute interpolator stage may immediately follow the attribute gradient setup stage. This allows sharing of an ALU, and may have added benefits in that attribute gradient setups can be avoided for hidden primitives that are rejected. Conventional GPU pipelines, in contrast, typically perform attribute gradient setup prior to hidden primitive rejection, which creates inefficiency that can be avoided by the techniques of this disclosure.

GPU pipeline 18 within GPU 14 includes several stages, including a vertex shader stage, several primitive setup stages, such as triangle setup and Z-Gradient setup, a rasterizer stage, a primitive rejection sages, an attribute gradient setup stage, an attribute interpolation stage, and a fragment shader stage. More or fewer stages may be included in other embodiments. Various ones of the different stages of GPU pipelines may also be referred to as "modules" of the pipeline in this disclosure.

In any case, the various primitive setup stages and primitive rejection stages only utilize vertex coordinates to form primitives and may discard a subset of the primitives that are unnecessary for the image. Primitives are the simplest types of geometric figures, including points, lines, triangles, and other polygons, and may be formed with one or more vertices within the image data. Primitives or portions of primitives may be rejected from consideration during processing of a specific frame of the image when the primitives or the portions of primitives are invisible (e.g., located on a backside of an object) within the image frame, or are hidden (e.g., located behind another object or transparent) within the image frame. This is the purpose of a hidden primitive and pixel rejection stages.

Attribute gradient setup and attribute interpolation stages may utilize the vertex attributes to compute attribute gradient values and interpolate the attributes based on the attribute gradient values. Techniques described in this disclosure defer the computationally intensive setup of attribute gradients to just before attribute interpolation in GPU pipeline 18. This allows a shared ALU to be used by both the attribute gradient setup and attribute interpolation stages. The vertex attributes may be retrieved from extended vertex cache 16 for attribute gradient setup as one of the last steps before attribute interpolation in GPU pipeline 18. In this way, the vertex attributes are not introduced to GPU pipeline 18 until after primitive setup and primitive rejection, which creates efficiencies insofar as attribute gradient setup can be avoided for rejected primitives.

Moreover, by storing the attributes for vertices within the image data in extended vertex cache 16, GPU pipeline 18 can be made more efficient. In particular, the extended vertex cache 16 can eliminate the need to pass large amounts of attribute data through GPU pipeline 18, and may substantially eliminate bottlenecks in GPU pipeline 18 for primitives that include large numbers of attributes. In addition, deferring the attribute gradient setup to just before attribute interpolation in GPU pipeline 18 may improve image processing speed within GPU pipeline 18. More specifically, deferring the attribute gradient setup within GPU pipeline 18 until after rejection of the subset of the primitives that are unnecessary for the image may substantially reduce computations and power consumption as the attribute gradient setup will only be performed on a subset of the primitives that are necessary for the image.

Display 20 may be coupled to device 10 either wirelessly or with a wired connection. For example, device 10 may comprise a server or other computing device of a wireless communication service provider, and display 20 may be included within a wireless communication device. In this case, as examples, display 20 may comprise a display within a mobile radiotelephone, a satellite radiotelephone, a portable computer with a wireless communication card, a personal digital assistant (PDA) equipped with wireless communication capabilities, or any of a variety of devices capable of wireless communication. As another example, device 10 may comprise a server or other computing device connected to display 20 via a wired network, and display 20 may be included within a wired communication device or a device not principally directed to communication. In other embodiments, display 20 may be integrated within device 10.

Figure 2:
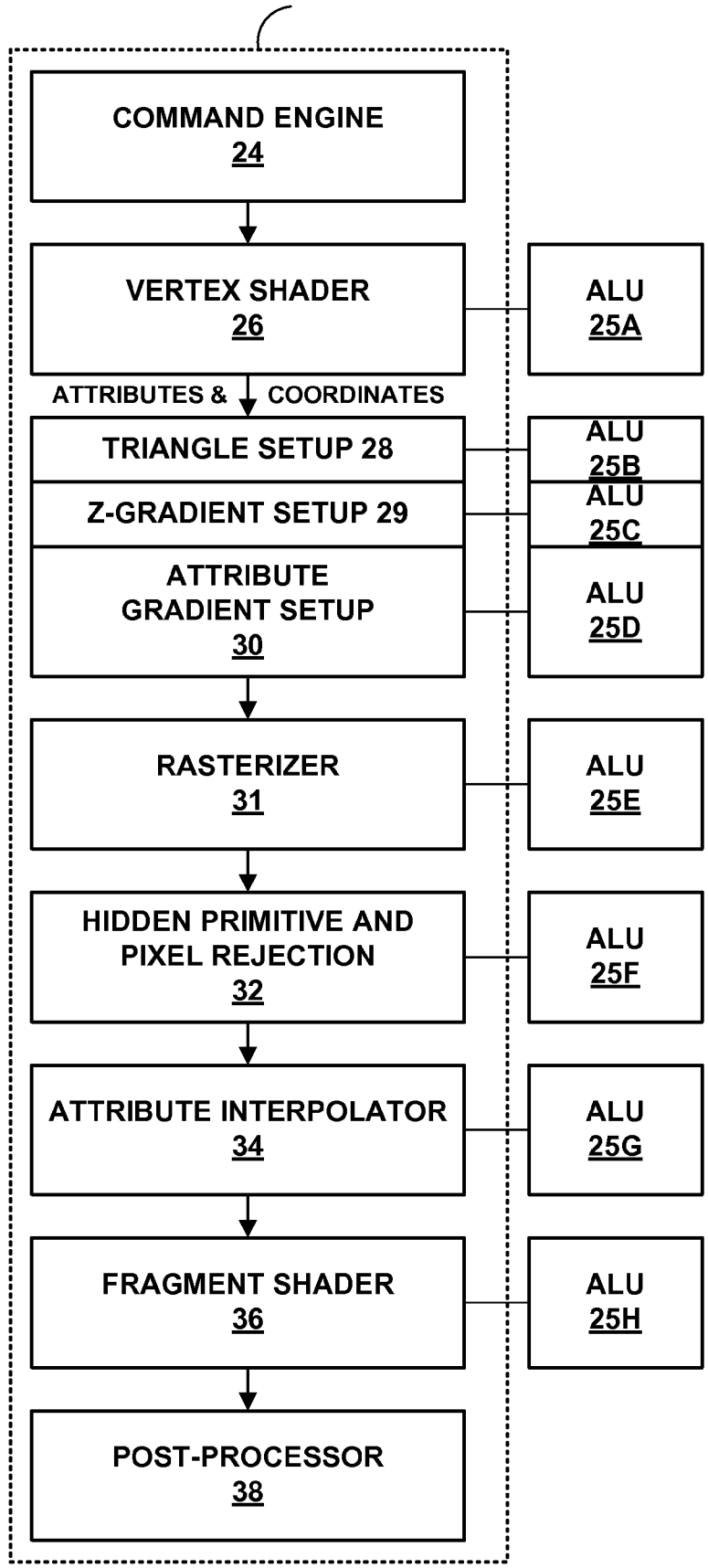
FIG. 2 is a block diagram illustrating a conventional GPU pipeline.

FIG. 2 is a block diagram illustrating a conventional GPU pipeline 22. GPU pipeline 22 of FIG. 2 includes, in the following order, a command engine 24, a vertex shader 26, a triangle setup module 28, a Z-Gradient setup module 29, an attribute gradient setup module 30, a rasterizer 31, a hidden primitive and pixel rejection module 32, an attribute interpolator 34, a fragment shader 36, and a post processor 38. Each of the vertex shader 26, triangle setup module 28, Z-Gradient setup module 29, attribute gradient setup module 30, rasterizer 31, hidden primitive and pixel rejection module 32, attribute interpolator 34, and fragment shader 36 includes a dedicated arithmetic logic unit (ALU), which are labeled as elements 25A-25H respectively.

Command engine 24 receives an image data for an image from a controller of the device in which conventional GPU pipeline 22 resides. The image data may correspond to representations of complex, two-dimensional or three-dimensional computerized graphics. Command engine 24 passes the image data along GPU pipeline 22 to the other processing stages. In particular, all of the attributes and coordinates of the image data are passed from stage to stage along GPU pipeline 22. Each respective stage uses its respective ALU, and if any bottlenecks occur, the image processing may be stalled at that respective stage.

Figure 3:
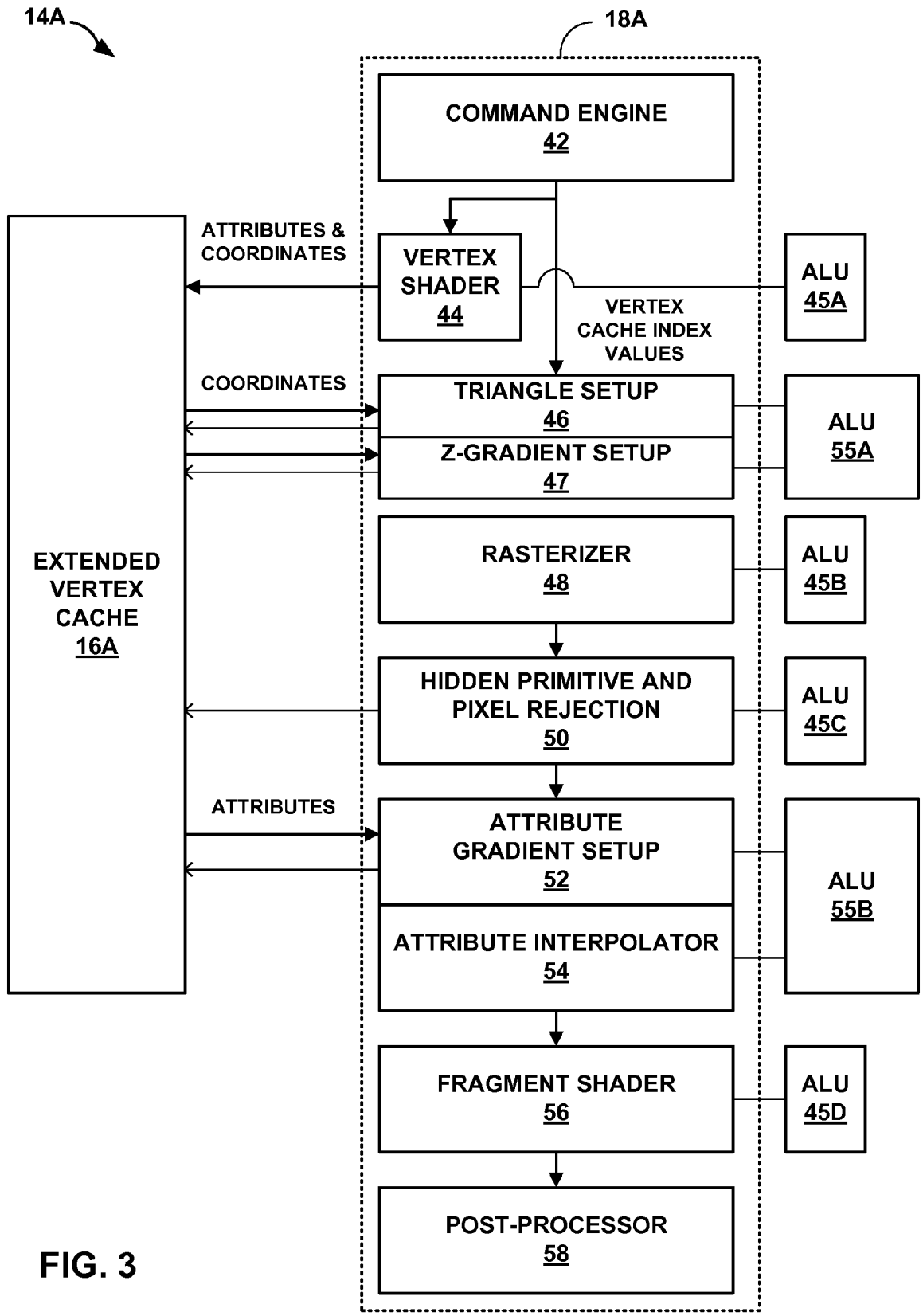
FIG. 3 is a block diagram illustrating an exemplary GPU according to an embodiment of this disclosure.

FIG. 3 is a block diagram illustrating a GPU 14A, an exemplary embodiment of GPU 14 from FIG. 1, including a GPU pipeline 18A. A set of ALUs 45A, 55A, 45B, 45C, 55B and 45D, and an extended vertex cache 16A are coupled to GPU pipeline 18A. Extended vertex cache 16A within GPU 14A may reduce an amount of data passing through GPU pipeline 18A within GPU 14A. Moreover, ALUs 55A and 55B are shared ALUs, each of which are used by two different successive stages in the GPU pipeline 18A. Notably, the stages of GPU pipeline 18A are rearranged relative to conventional GPU pipeline 22 of FIG. 2, which may facilitate the sharing of ALU 55B by attribute gradient setup module 52 and attribute interpolator 54. Moreover, because attribute gradient setup module 52 is executed after hidden primitive and pixel rejection module 50, efficiencies are gained. Namely, attribute gradient setup may be avoided for any hidden or rejected primitives.

In the illustrated embodiment of FIG. 3, GPU pipeline 18A includes a command engine 42, a vertex shader 44, a triangle and Z-Gradient setup modules 46 and 47, a rasterizer 48, a hidden primitive and pixel rejection module 50, an attribute gradient setup module 52, an attribute interpolator 54, a fragment shader 56, and a post processor 58. Again, the order of these stages is non-conventional insofar as attribute gradient setup module 52 follows hidden primitive and pixel rejection module 50. Attribute interpolator 54 immediately follows attribute gradient setup module 52. Triangle and Z-Gradient setup modules 46 and 47 may be collectively referred to as primitive setup modules, and some cases, other types of primitive setups may also be used.

Command engine 42 receives image data, which may include rendering commands, for an image from controller 12 of device 10. The image data may correspond to representations of complex, two-dimensional or three-dimensional computerized graphics. Command engine 42 passes a subset of this data, i.e., information for vertices within the image data that are not included in extended vertex cache 16A ("missed vertices") to vertex shader 44. Command engine 42 will pass vertex cache index information for missed vertices to primitive setup and rejection module 46. Command engine 42 passes vertex cache index information for vertices within the image data that are already included in extended vertex cache 16A ("hit vertices") directly to primitive setup and rejection module 46. Vertex data for hit vertices are not typically sent to vertex shader 44. Initial processing of hit and missed vertices within the image data is described in more detail below.

GPU pipeline 18A includes several stages, although the techniques of this disclosure may operate in pipelines with more or fewer stages than those illustrated. Vertex shader 44 is applied to the missed vertices within the image data and determines surface properties of the image at the missed vertices within an image data. In this way, vertex shader 44 generates vertex coordinates and attributes of each of the missed vertices within the image data. Vertex shader 44 then stores the attributes for the missed vertices in extended vertex cache 16A. In this manner, the attributes need not be passed along the GPU pipeline 18A, but can be accessed from extended vertex cache 16A, as needed, by respective stages of the GPU pipeline 18A. Vertex shader 44 is not applied to each of the hit vertices within the image data as vertex coordinates and attributes of each of the hit vertices may have been previously generated and stored in extended vertex cache 16A.

The vertex coordinates identify the vertices within the image data (such as geometry within the image) based on, for example, a four-dimensional coordinate system with X, Y, and Z (width, height, and depth) coordinates that identify a location of a vertex within the image data, and a W coordinate that comprises a perspective parameter for the image data. The vertex attributes, for example, may include color, normal, and texture coordinates associated with a vertex. Extended vertex cache 16A may be easily configured for different numbers of attributes and primitive types. Vertex cache index values that indicate storage locations within extended vertex cache 16A of the vertex coordinates and attributes for both the hit and missed vertices in the image data are then placed in a buffer (not shown) positioned between command engine 42 and primitive setup and rejection module 46.

Triangle setup 46 and Z-Gradient setup 47 are exemplary primitive setup stages, although additional primitive setup stages may also be included. A shared ALU 55A is used by both triangle setup 46 and Z-Gradient setup 47. The different stages use either vertex coordinates or vertex attributes to process a respective image. For example, triangle setup 46, Z-Gradient setup 47, rasterizer 48, and hidden primitive and pixel rejection module 50 only utilize the vertex coordinates. However, attribute gradient setup module 52 and attribute interpolator 54 utilize the vertex attributes. Therefore, according to this disclosure, attribute gradient setup module 52 is deferred to just before attribute interpolator 54 in GPU pipeline 18A. The vertex attributes may be retrieved from extended vertex cache 16A for attribute gradient setup module 52 as one of the last steps in GPU pipeline 18A before interpolating the attributes with attribute interpolator 54. In this way, the vertex attributes are not introduced to GPU pipeline 18A until after hidden primitive and pixel rejection module 50, and just before attribute interpolator 54, providing significant gains in efficiency.

Moreover, because attribute interpolator 54 immediately follows attribute gradient setup module 52, these respective stages may share ALU 55B. For large sized primitives, ALU 55B will be utilized most for interpolation. Alternatively, when primitives are small, ALU 55B will be used mostly for attribute setup. A relatively large ALU 55B can promote processing speed particularly for gradient setup, although a relatively small ALU 55B can reduce power consumption at a cost of performance speed in the gradient setup.

Again, by storing the vertex attributes for the vertices of image data in extended vertex cache 16A, device 10 can eliminate a large amount of data from passing through GPU pipeline 18A, which reduces the width of the internal data bus included in GPU pipeline 18A. By reducing the amount of data movement, these techniques can also reduce power consumption within GPU 18A. In addition, with the exception of a buffer that may be positioned between command engine 42 and primitive setup and rejection module 46, buffers positioned between each of the processing stages may be removed from GPU pipeline 18A to reduce the area of GPU 14A within device 10.

Primitive setup modules 46 and 47 (and possibly other types of primitive setups) receive the vertex cache index values for the attributes of each of the vertices in the image data. Primitive setup modules 46 and 47 then retrieve vertex coordinates for each of the vertices within the image data using the vertex cache index values. Primitive setup modules 46 and 47 form the respective primitives with one or more vertices within the image data. Primitives are the simplest types of geometric figures and may include points, lines, triangles, and other polygons. According to this disclosure, the triangle setup 28 and Z-Gradient setup 29 can share ALU 55A in order to promote efficiency. The triangle setup 28 and Z-Gradient setup 29 may also share a lookup table for reciprocal operation for additional efficiency. A Z-Gradient refers to a difference of two Z coordinates of two neighbor pixels over a triangle in either X direction or Y direction. Z-Gradient setup is used to compute the difference of two Z values by using three original vertices' Z values of the triangle and XY coordinates.

In some cases, primitive setup modules 46 and 47 may also reject some primitives by performing scissoring and backface culling using the XY coordinates of the vertices within the image data. Scissoring and backface culling rejects primitives and portions of primitives from consideration during processing of a specific frame of the image when the primitives and the portions of primitives are invisible within the image frame. For example, the primitives and the portions of primitives may be located on a backside of an object within the image frame. Primitive setup modules 46 and 47 may request extended vertex cache 16A to release storage space for the attributes associated with the rejected primitives. By only moving the primitives for the image data, the vertex coordinates associated with the primitives, and the vertex cache index values for each of the vertices within the primitives through GPU pipeline 18A, device 10 may substantially eliminate bottlenecks in GPU pipeline 18A for primitives that include large numbers of attributes.

Rasterizer 48 converts the primitives for the image data into pixels based on the XY coordinates of vertices within the primitives and the number of pixels included in the primitives. Hidden primitive and pixel rejection module 50 rejects additional hidden primitives and hidden pixels within the primitives using the early depth and stencil test based on the Z coordinates of the vertices within the primitives. If hidden primitive and pixel rejection module 50 rejects all pixels within a primitive, the primitive is automatically rejected. Primitives or pixels within primitives may be considered hidden, and be rejected from consideration during processing of a specific frame of the image, when the primitives or the pixels within primitives are located behind another object within the image frame or are transparent within the image frame. Hidden primitive and pixel rejection module 50 may request extended vertex cache 16A to release storage space for the attributes associated with the rejected primitives.

Typically, a large percentage of primitives are rejected by scissoring and backface culling performed by primitive setup and rejection modules 46, 47, and the early depth and stencil test performed by hidden primitive and pixel rejection module 50. Therefore, by deferring the attribute gradient setup stage 52 until after hidden primitive and pixel rejection 50, computations can be eliminated for attributes associated with a subset of the primitives that are rejected as being hidden and unnecessary for the image.

Attribute gradient setup module 52 retrieves the vertex attributes from extended vertex cache 16A using the vertex cache index values for each of the vertices within the primitives. Attribute gradient setup module 52 computes gradients of attributes associated with the primitives for the image data. An attribute gradient comprises a difference between the attribute value at a first pixel and the attribute value at a second pixel within a primitive moving in either a horizontal (X) direction or a vertical (Y) direction. After attribute gradient setup module 52 computes gradients of attributes of all vertices within a primitive for the image data, attribute gradient setup module 52 may request extended vertex cache 16A to release storage space for the attributes of the vertices within the primitive.

Once the attribute gradient values are computed, attribute interpolator 54 interpolates the attributes over pixels within the primitives based on the attribute gradient values. Again, the same ALU 55B is used in the attribute gradient setup stage 52 and the attribute interpolator stage 54. The interpolated attribute values are input to fragment shader 56 to perform pixel rendering of the primitives. Fragment shader 56 determines surface properties of the image at pixels within the primitives for the image data. Results of fragment shader 56 are then output to post-processor 58 for presentation of the processed image on display 20.

In some cases, vertex shader 44 may not be applied to missed vertices within the image data. It may be assumed that vertex coordinates and attributes of all vertices within the image data are determined external to GPU pipeline 18A. Therefore, primitives formed with the missed vertices do not need vertex shader 44 to calculate attributes of the missed vertices. In this case, extended vertex cache 16A may operate as an extended vertex buffer. Command engine 42 may assign vertex index values that identify storage location for the attributes within the extended vertex buffer and send the predetermined vertex coordinates and attributes of each of the vertices within the image data to the extended vertex buffer.

Figure 4:
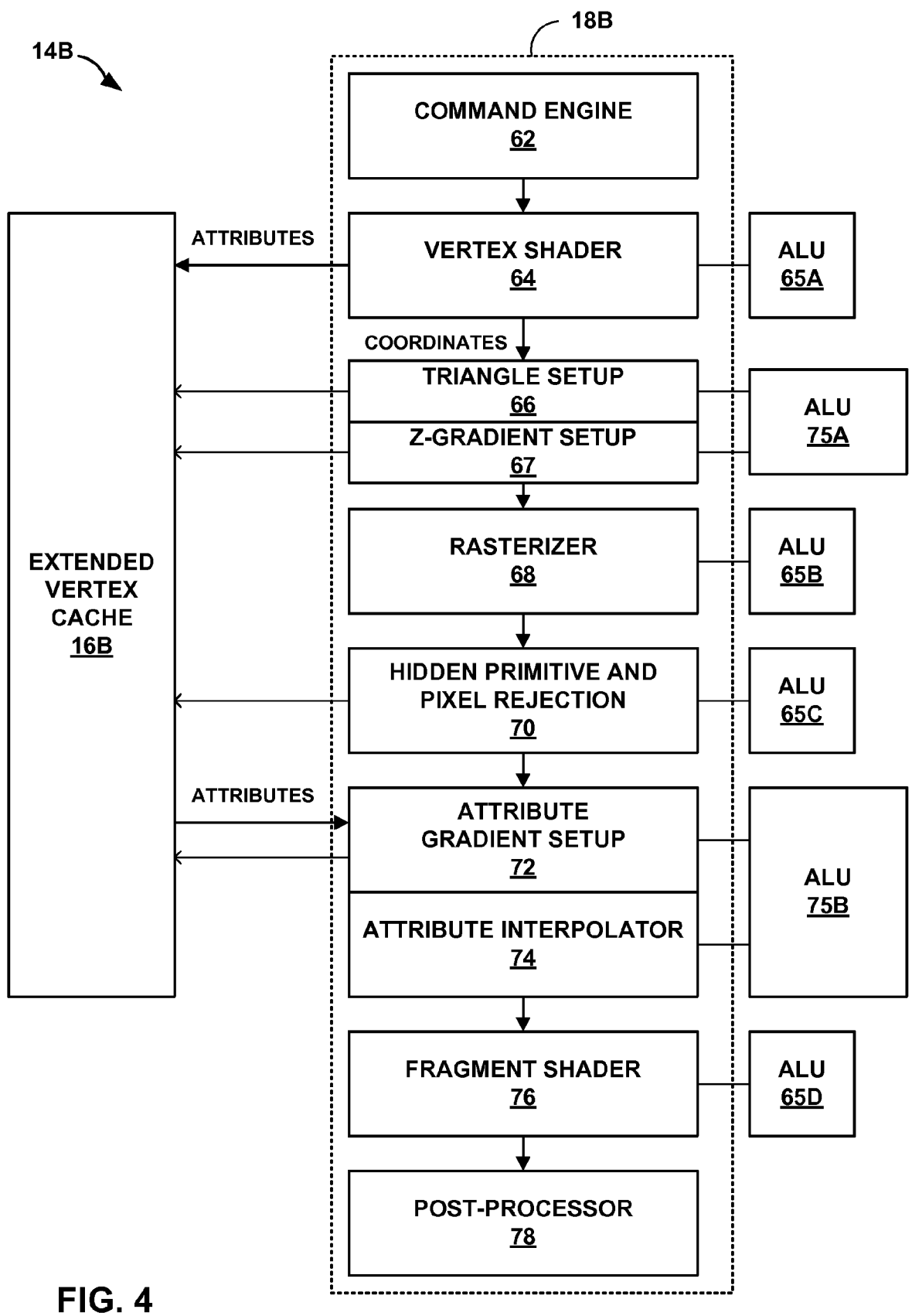
FIG. 4 is a block diagram illustrating an exemplary GPU according to another embodiment of this disclosure.

FIG. 4 is a block diagram illustrating GPU 14B, another exemplary embodiment of GPU 14 from FIG. 1, including a GPU pipeline 18B and an extended vertex cache 16B coupled to GPU pipeline 18B. In the illustrated embodiment, GPU pipeline 18B includes a command engine 62, a vertex shader 64, a triangle set up module 66, and Z-Gradient setup module 67 (modules 66 and 67 are collectively referred to as primitive setup modules), a rasterizer 68, a hidden primitive and pixel rejection module 70, an attribute gradient setup module 72, an attribute interpolator 74, a fragment shader 76, and a post-processor 78. GPU 14B illustrated in FIG. 4 may operate substantially similar to GPU 14A illustrated in FIG. 3, except for the initial processing of vertices in the image data. The different stages utilize ALUs 65A, 75A, 65B, 65C, 75B and 65D respectively. Notably, ALUs 75A and 75B are shared for two different stages of GPU pipeline 18B.

Command engine 62 receives image data, including geometry and rendering commands, for an image from controller 12 of device 10. Command engine 62 passes the image data along GPU pipeline 18B to the other processing stages. In other words, command engine 62 passes information for all the vertices within the image data to vertex shader 64.

In the embodiment of FIG. 4, vertex shader 64 is applied to all vertices within the image data. Vertex shader 64 is applied to the image data and determines surface properties of the image at the vertices within the image data. In this way, vertex shader 64 generates vertex coordinates and attributes of each of the vertices within the image data. Vertex shader 64 then stores only the attributes in extended vertex cache 16B. Vertex shader 64 passes the vertex coordinates and vertex cache index values that indicate storage locations of the attributes within extended vertex cache 16B for each of the vertices in the image data along GPU pipeline 18B.

Since vertex shader 64 passes the vertex coordinates and vertex cache index values for the vertices in the image data directly to primitive setup and rejection module 66, all the buffers positioned between each of the processing stages may be removed from GPU pipeline 18B. Primitive setup modules 66 and 67 forms primitives with one or more vertices within the image data. These primitive setup modules 66 and 67 may share one or more ALUs. Primitive setup and rejection module 66 may request extended vertex cache 16B to release storage space for the attributes associated with the rejected primitives.

Rasterizer 68 converts the primitives for the image data into pixels based on the XY coordinates of vertices within the primitives and the number of pixels included in the primitives. Hidden primitive and pixel rejection module 70 rejects hidden primitives and hidden pixels within the primitives using the early depth and stencil test based on the Z coordinates of the vertices within the primitives. Hidden primitive and pixel rejection module 70 may request extended vertex cache 16B to release storage space for the attributes associated with the rejected primitives.

Attribute gradient setup module 72 retrieves the vertex attributes from extended vertex cache 16B using the vertex cache index values for each of the vertices within the primitives. Attribute gradient setup module 72 computes gradients of attributes associated with the primitives for the image data. After attribute gradient setup module 72 computes gradients of attributes of all vertices within a primitive for the image data, attribute gradient setup module 72 may request extended vertex cache 16B to release storage space for the attributes of the vertices within the primitive.

Once the attribute gradient values are computed, attribute interpolator 74 interpolates the attributes over pixels within the primitives based on the attribute gradient values by sharing one or more ALUs with the attribute gradient setup module 72. The interpolated attribute values are then input to fragment shader 76 to perform pixel rendering of the primitives. Fragment shader 76 determines surface properties of the image at pixels within the primitives for the image data. Results of fragment shader 76 will be output to post-processor 78 for presentation of the processed image on display 20.

Figure 5:
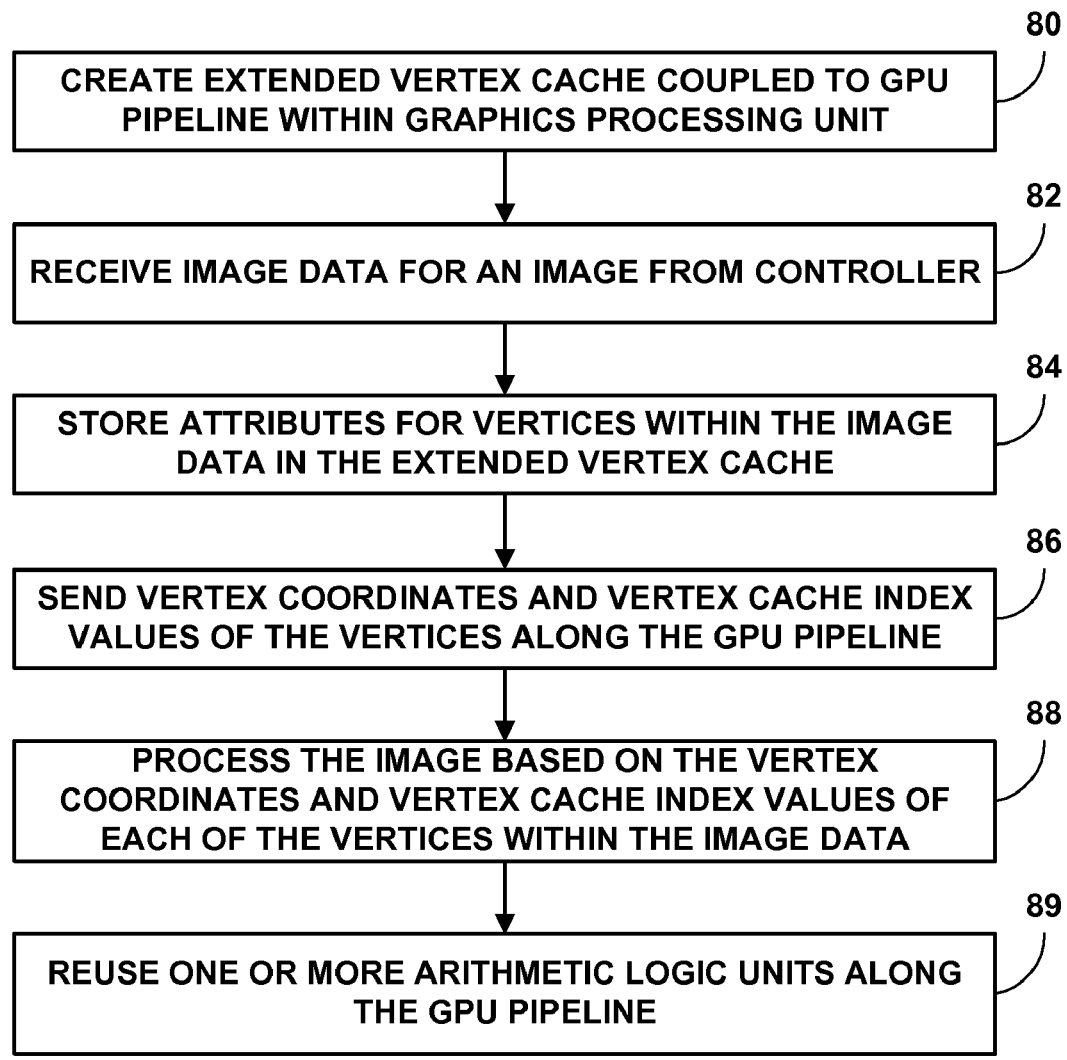
FIGS. 5 and 6 are flowcharts illustrating techniques that may be performed in a GPU pipeline according to embodiments of this disclosure.

FIG. 5 is a flowchart illustrating an exemplary operation of processing an image within a GPU using an extended vertex cache. The operations of FIG. 5 will be described with reference to GPU 14 from FIG. 1 although similar techniques could be used with other GPUs. Extended vertex cache 16 may be created within GPU 14 during manufacture of device 10 and coupled to GPU pipeline 18 (80). Extended vertex cache 16 may be easily configured for different numbers of attributes and primitive types.

GPU 14 receives image data, which may include rendering commands and geometry, for an image from controller 12 of device 10 (82). The image data may correspond to representations of complex, two-dimensional or three-dimensional computerized graphics. GPU 14 sends the image data to GPU pipeline 18 to process the image for display on display 20 connected to device 10. GPU pipeline 18 stores attributes for vertices within the image data in extended vertex cache 16 (84). In some embodiments, GPU pipeline 18 temporarily stores vertex coordinates for the vertices within the image data in extended vertex cache 16.

GPU pipeline 18 then sends vertex coordinates that identify the vertices, and vertex cache index values that indicate storage locations of the attributes for each of the vertices in extended vertex cache 16 to other processing stages along GPU pipeline 18 (86). GPU pipeline 18 processes the image based on the vertex coordinates and the vertex cache index values for each of the vertices in the image data (88). During such processing, GPU pipeline 18 reuses one or more ALUs 18 along the GPU pipeline 18 (89). Specifically, according to this disclosure, a shared ALU can be used for an attribute gradient setup stage and an attribute interpolation stage. The non-conventional ordering of the GPU pipeline may facilitate the ability for the attribute gradient setup stage and the attribute interpolation stage to share an ALU.

Figure 6:
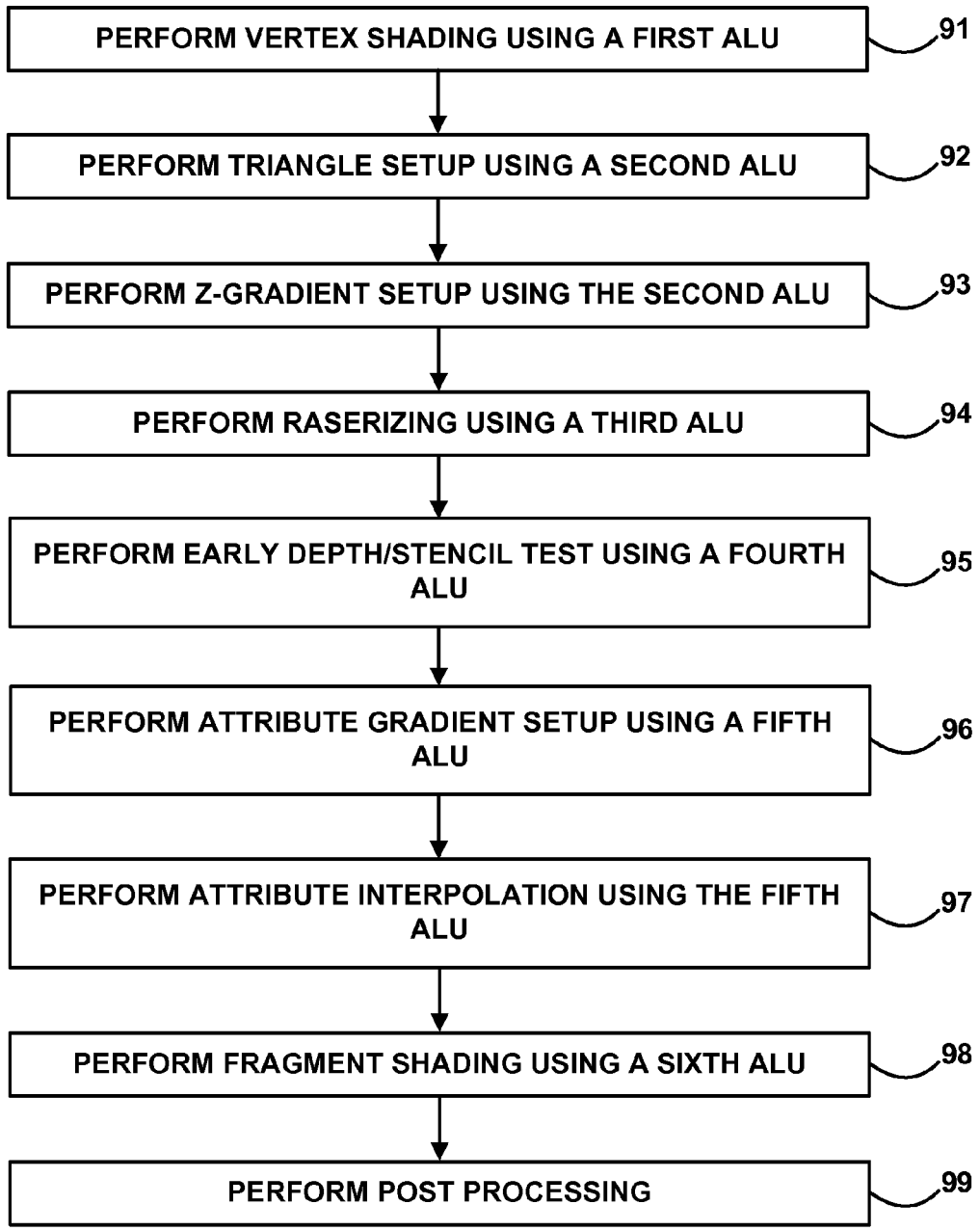

FIG. 6 is a flowchart illustrating another exemplary operation of processing an image with a GPU pipeline using shared ALUs. For purposes of explanation, the operation shown in FIG. 6 will be described with reference to GPU 14A from FIG. 3 although similar techniques could be used with other GPUs. Command engine 42 receives image data, including geometry and rendering commands, for an image and passes the image data along GPU pipeline 18B. As shown in FIG. 6, vertex shader 44 performs vertex shading using a first ALU 45A (91). Triangle setup module 46 performs triangle setup for any triangle primitives using a second ALU 55A (92). This second ALU 55A is reused by another stage insofar as Z-Gradient setup module 47 performs Z-Gradient setup using second ALU 55A (93). Rasterizer then performs rasterizing using a third ALU 45B (94).

Hidden primitive and pixel rejection module 50 performs an early depth/stencil test using a forth ALU 45C in order to remove primitives that will not be viewable in the final image (95). Such non-viewable primitives, for example, may be covered by other objects or shapes and can be removed from the image without sacrificing any image quality. Attribute gradient setup module uses a fifth ALU 55B for attribute gradient setup (96), which notably, does not occur with respect to rejected primitives. Attribute interpolator 54 then uses the fifth ALU 55B (97), which was also used for attribute gradient setup, in order to perform any interpolations. Fragment shader 56 performs fragment shading (98), and post processor 58 performs any final post processing prior to image display (99). As noted above, an extended vertex cache 16A may be implemented along GPU pipeline 18A in order to reduce complexity and eliminate the need to propagate large amounts of data through the respective stages. Instead, each respective stage that needs portions of the image data can access such data stored in extended vertex cache 16A.

A number of embodiments have been described. However, various modifications to these embodiments are possible, and the principles presented herein may be applied to other embodiments as well. The techniques and methods described herein may be implemented in hardware, software, and/or firmware. The various tasks of such methods may be implemented as sets of instructions executable by one or more arrays of logic elements, microprocessors, embedded controllers, or integrated processor cores. In one example, one or more such tasks are arranged for execution within a chipset that is configured to control operations of various devices of a personal communications device, such as a so-called cellular telephone.

In various examples, the techniques described in this disclosure may be implemented within a general purpose microprocessor, digital signal processor (DSP), application specific integrated circuit (ASIC), field programmable gate array (FPGA), or other equivalent logic devices. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like. The instructions cause a machine, such as a programmable processor, to perform the techniques described in this disclosure.

As further examples, an embodiment may be implemented in part or in whole in a hard-wired circuit, in a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. The data storage medium may be an array of storage elements such as semiconductor memory (which may include without limitation dynamic or static RAM, ROM, and/or flash RAM) or ferroelectric, ovonic, polymeric, or phase-change memory, or a disk medium such as a magnetic or optical disk.

In this disclosure, various techniques have been described for processing images with a GPU using an extended vertex cache and one or more shared ALUs. The techniques may substantially eliminate bottlenecks in the GPU pipeline for primitives that include large numbers of attributes, and can promote efficient processing that substantially reduces idle time of ALUs. In addition, the techniques improve image processing speed within the GPU pipeline by deferring the attribute gradient setup to just before attribute interpolation in the GPU pipeline. More specifically, deferring the attribute gradient setup within the GPU pipeline until after rejection of a subset of the primitives that are unnecessary for the image may substantially reduce computations and power consumption as the attribute gradient setup will only be performed on a subset of the primitives that are necessary for the image. This arrangement of the stages also facilitates ALU sharing by the attribute gradient setup and attribute interpolation stages. These and other embodiments are within the scope of the following claims.

The invention claimed is:

1. A method comprising:
receiving image data for an image within a graphics processing unit (GPU) pipeline that processes the image data within multiple stages using a same shared arithmetic logic unit and at least one other arithmetic logic unit; and
processing the image data within the GPU pipeline using the same shared arithmetic logic unit for an attribute gradient setup stage, which computes gradients of attributes associated with primitives for the image data, and for an attribute interpolator stage, which interpolates the attributes over pixels within the primitives based on the gradients, other stages of the multiple stages using the at least one other arithmetic logic unit, wherein the attribute gradient setup stage and the attribute interpolator stage follow a rasterizer stage, the rasterizer stage converts primitives into pixels using vertex coordinate data.

2. The method of claim 1, wherein the the attribute interpolator stage that uses the same shared arithmetic logic unit as the attribute gradient setup stage immediately follows the attribute gradient setup stage.

3. The method of claim 1, wherein the same shared arithmetic logic unit comprises a first shared arithmetic logic unit and the at least one other arithmetic logic unit comprises a second shared arithmetic logic unit, the method further comprising:
using the second shared arithmetic logic unit for a triangle setup stage; and
using the second shared arithmetic logic unit for a Z-Gradient setup stage.

4. The method of claim 1, further comprising using a shared lookup table for reciprocal operation for a triangle setup stage and a Z-Gradient setup stage.

5. The method of claim 3, wherein:
the Z-Gradient setup stage using the second shared arithmetic logic unit immediately follows the triangle setup stage using the second shared arithmetic logic unit in the GPU pipeline; and
the attribute interpolator stage using the first shared arithmetic logic unit immediately follows the attribute gradient setup stage using the first shared arithmetic logic unit in the GPU pipeline.

6. The method of claim 5, wherein the attribute gradient setup and attribute interpolator stages follow a hidden primitive and pixel rejection stage in the GPU pipeline.

7. The method of claim 6, wherein the hidden primitive and pixel rejection stage follows the Z-Gradient setup and triangle setup stages in the GPU pipeline.

8. The method of claim 1, further comprising:
storing attributes for vertices within the image data in an extended vertex cache coupled to the GPU pipeline; and
processing the image data within the GPU pipeline based on vertex coordinates that identify the vertices and vertex cache index values, wherein the vertex cache index values indicate storage locations of the attributes within the extended vertex cache for each of the vertices within the image data.

9. A non-transitory computer-readable medium comprising instructions that upon execution cause a machine, which has a graphic processing unit (GPU) pipeline, the machine to:
receive image data for an image within the GPU pipeline that processes the image data within multiple stages using a same shared arithmetic logic unit and at least one other arithmetic logic unit; and
process the image data within the GPU pipeline using a same shared arithmetic logic unit for an attribute gradient setup stage, which computes gradients of attributes associated with primitives for the image data, and an attribute interpolator stage, which interpolates the attributes over pixels within the primitives based on the gradients, other stages of the multiple stages using the at least one other arithmetic logic unit, wherein the attribute gradient setup stage and the attribute interpolator stage follow a rasterizer stage, the rasterizer stage converts primitives into pixels using vertex coordinate data.

10. The non-transitory computer-readable medium of claim 9, wherein the machine comprises a programmable processor processing the image data within the GPU pipeline in accordance with the instructions.

11. The non-transitory computer readable medium of claim 9, wherein the attribute interpolator stage that uses the same shared arithmetic logic unit as the attribute gradient setup stage immediately follows the attribute gradient setup stage.

12. The non-transitory computer readable medium of claim 10, wherein the same shared arithmetic logic unit comprises a first shared arithmetic logic unit and the at least one other arithmetic logic unit comprises a second shared arithmetic logic unit, and wherein the instructions upon execution cause the machine to:
use the second shared arithmetic logic unit for a triangle setup stage; and
use the second shared arithmetic logic unit for a Z-Gradient setup stage.

13. The non-transitory computer readable medium of claim 9, wherein the instructions upon execution cause the machine to use a shared lookup table for reciprocal operation for a triangle setup stage and a Z-Gradient setup stage.

14. The non-transitory computer readable medium of claim 12, wherein:
the Z-Gradient setup stage using the second shared arithmetic logic unit immediately follows the triangle setup stage using the second shared arithmetic logic unit in the GPU pipeline; and
the attribute interpolator stage using the first shared arithmetic logic unit immediately follows the attribute gradient setup stage using the first shared arithmetic logic unit in the GPU pipeline.

15. The non-transitory computer readable medium of claim 14, wherein the attribute gradient setup and attribute interpolator stages follow a hidden primitive and pixel rejection stage in the GPU pipeline.

16. The non-transitory computer readable medium of claim 15, wherein the hidden primitive and pixel rejection stage follows the Z-Gradient setup and triangle setup stages in the GPU pipeline.

17. The non-transitory computer readable medium of claim 9, wherein the instructions upon execution cause the machine to:
store attributes for vertices within the image data in an extended vertex cache coupled to the GPU pipeline; and
process the image data within the GPU pipeline based on vertex coordinates that identify the vertices and vertex cache index values, wherein the vertex cache index values indicate storage locations of the attributes within the extended vertex cache for each of the vertices within the image data.

18. A device comprising:
a graphics processing unit (GPU) pipeline that receives image data for an image and processes the image data within multiple stages using a same shared arithmetic logic unit and at least one other arithmetic logic unit, wherein the multiple stages include an attribute gradient setup stage and an attribute interpolator stage; and
a same shared arithmetic logic unit that performs attribute gradient setups and attribute interpolations associated with both the attribute gradient setup stage and the attribute interpolator stage the same shared arithmetic logic unit computes gradients of attributes associated with primitives for the image data and interpolates the attributes over pixels within the primitives based on the gradients, other stages of the multiple stages using the at least one other arithmetic logic unit, wherein the attribute gradient setup stage and the attribute interpolator stage follow a rasterizer stage, the rasterizer stage converts primitives into pixels using vertex coordinate data.

19. The device of claim 18, wherein the attribute interpolator stage that uses the same shared arithmetic logic unit as the attribute gradient setup stage immediately follows the attribute gradient setup stage.

20. The device of claim 18, wherein the same shared arithmetic logic unit comprises a first shared arithmetic logic unit, the device's at least one other arithmetic logic unit further comprising a second shared arithmetic logic used for both a triangle setup stage and a Z-Gradient setup stage in the GPU pipeline.

21. The device of claim 18, further comprising a shared lookup table for reciprocal operation used in both a triangle setup stage and a Z-Gradient setup stage.

22. The device of claim 19, wherein:
the Z-Gradient setup stage using the second shared arithmetic logic unit immediately follows the triangle setup stage using the second shared arithmetic logic unit in the GPU pipeline; and the attribute interpolator stage using the first shared arithmetic logic unit immediately follows the attribute gradient setup stage using the first shared arithmetic logic unit in the GPU pipeline.

23. The device of claim 22, wherein the attribute gradient setup and attribute interpolator stages follow a hidden primitive and pixel rejection stage in the GPU pipeline.

24. The device of claim 23, wherein the hidden primitive and pixel rejection stage follows the Z-Gradient setup and triangle setup stages in the GPU pipeline.

25. The device of claim 18, further comprising an extended vertex cache coupled to the GPU pipeline, wherein attributes for vertices within the image data are stored in the extended vertex cache, and the image is processed within the GPU pipeline based on vertex coordinates that identify the vertices and vertex cache index values, wherein the vertex cache index values indicate storage locations of the attributes within the extended vertex cache for each of the vertices within the image data.

26. A device comprising:
   means for receiving image data for an image within a graphics processing unit (GPU) pipeline, the GPU pipeline having multiple stages and using a same shared arithmetic logic unit and at least one other arithmetic logic unit;
   means for processing the image data in an attribute gradient setup stage, which computes gradients of attributes associated with primitives for the image data, using the same shared arithmetic logic unit; and
   means for processing the image data in an attribute interpolator stage, which interpolates the attributes over pixels within the primitives based on the gradients, using the same shared arithmetic logic unit, other stages of the multiple stages using the at least one other arithmetic logic unit, wherein the attribute gradient setup stage and the attribute interpolator stage follow a rasterizer stage, the rasterizer stage converts primitives into pixels using vertex coordinate data.

27. The device of claim 26, wherein the at least one other arithmetic logic unit comprises another shared arithmetic logic unit, the device further comprising:
   means for using the another shared arithmetic logic unit for a triangle setup stage; and
   means for using the another shared arithmetic logic unit for a Z-Gradient setup stage.

28. The device of claim 26, further comprising means for using a shared lookup table for reciprocal operation for a triangle setup stage and a Z-Gradient setup stage.

29. The device of claim 27, wherein the means for processing comprises a graphics processing unit (GPU) pipeline and wherein:
   the Z-Gradient setup stage using the another shared arithmetic logic unit immediately follows the triangle setup stage using the another shared arithmetic logic unit in the GPU pipeline; and
   the attribute interpolator stage using the same shared arithmetic logic unit immediately follows the attribute gradient setup using the same shared arithmetic logic unit stage in the GPU pipeline.

30. The device of claim 27, wherein the attribute gradient setup and attribute interpolator stages follow a hidden primitive and pixel rejection stage in the GPU pipeline, and the hidden primitive and pixel rejection stage follows the Z-Gradient setup and triangle setup stages in the GPU pipeline.

* * * * *